（12) United States Patent
Mumme

(10) Patent No.: US 6,415,548 B1
(45) Date of Patent: Jul. 9, 2002

(54) MINI-GARDEN BAG

(76) Inventor: Christian F. Mumme, P.O. Box 240, Eastport, ME (US) 04531-0248

( * ) Notice: Subject to any disclaimer, the term of this patent is extended or adjusted under 35 U.S.C. 154(b) by 0 days.

(21) Appl. No.: 09/612,728

(22) Filed: Jul. 10, 2000

(51) Int. Cl.⁷ .............................................. A01G 31/00
(52) U.S. Cl. ...................................................... 47/65.8
(58) Field of Search ................... 47/65.8, 65.5, 47/26

(56) References Cited

U.S. PATENT DOCUMENTS

| | | | | |
|---|---|---|---|---|
| 3,733,745 A | * | 5/1973 | Ingerstedt et al. ............ 47/65.8 |
| 4,299,056 A | * | 11/1981 | Towning ........................ 47/81 |
| 4,918,861 A | * | 4/1990 | Carpenter ...................... 47/59 |
| 5,081,791 A | * | 1/1992 | Baron ............................ 47/66 |
| 5,241,783 A | * | 9/1993 | Krueger ......................... 47/66 |
| 5,309,673 A | * | 5/1994 | Stover ........................... 47/59 |
| 5,761,847 A | * | 6/1998 | Ito ................................. 47/65.8 |
| 5,946,854 A | * | 9/1999 | Guillemain et al. .......... 47/65.8 |
| 6,016,628 A | * | 1/2000 | Schlosser ..................... 47/65.8 |
| 6,058,651 A | * | 5/2000 | Perez ............................ 47/65.8 |

* cited by examiner

Primary Examiner—Charles T. Jordan
Assistant Examiner—Francis T. Palo
(74) Attorney, Agent, or Firm—Charles A. McClure

(57) ABSTRACT

A mini-garden bag, adapted to lie on a relatively flat surface, contains a suitable plant mix of nutrients appropriately fertilized and pH-adjusted as desired. The bag is pre-marked to be slit through at intervals (a) on its top surface to admit seeds or seedlings and water, and also (b) on its bottom surface to drain excess water. The absorption/reflectivity of the bag surface can be modified by the grower, as desired, by peeling away and/or by reattaching shiny or dark strips of the bag's exposed surface, to adjust the effect of sunlight on the interior temperature, thereby enabling growers to accentuate or to counter prevailing climate or some changes therein.

12 Claims, 3 Drawing Sheets

MINI-GARDEN BAG

TECHNICAL FIELD

This invention relates to conversion of bag-like containers of a plant-growth nutrient, such as animal manure, compost, and/or peat or the like, into starter or even season-long "mini-gardens".

BACKGROUND OF THE INVENTION

Gardeners are known to have used readily portable containers of nutrient material as an accessory to, or even a substitute for, an in-ground garden of individual and/or multiple plants, especially in confined locations. Some such containers may be characterized properly as textile "bags" or "sacks" or as paper "sacks" or "cartons". Recently similar containers made of polymeric filaments or film have been so characterized and so utilized. Such containers are customarily called "bags" here, regardless of their composition.

Usually such a container (regardless of what it is called) is laid flat, and slits are opened in its uppermost horizontal surface to permit seeds or seedlings to be planted therein by insertion through the slits. Slits may be made in the lowermost surface of the container to allow excess water to flow down and out therefrom.

Pertinent examples found in U.S. patents include Towning, U.S. Pat. No. 4,299,056, for Self-Watering Plant Growing Bag; Krueger, U.S. Pat. No. 5,241,783, for Apparatus and Process for Growing Plants; and Ito, et al, for Plant-Growing System and Plant-Growing Method. Principal concerns of these inventors centered primarily upon water control, and only secondarily upon temperature control, to establish and to maintain favorable growing conditions for plants started or retained therein, and they disclose various bag accessory and component materials.

The present inventor appreciates the advances made by his noted predecessors, but he believes that his own ingenuity has resulted in optimally combined structural features and functional procedures not suggested by the noted inventors, or otherwise in the prior art.

In particular, he optimizes control of moisture and temperature differently, while providing an improved container of relatively simpler construction, dedicated to the practice of this invention.

A private season-long experiment succeeded in raising beans, corn, cucumbers, muskmelon, squash, and tomatoes satisfactorily by means of the mini-garden bag of this invention, whose extent of use depends primarily upon the space available, as other variables are subjected to control by the grower to a remarkably large extent.

SUMMARY OF THE INVENTION

A primary object of the present invention is to provide a plant nutrient bag adapted to grow plants in various climatic conditions.

Another object of this invention is to enable annual plants to be raised in, and harvested from, such bags without transplantation.

A further object of the invention is to enable adjustment of internal temperature, as well as moisture, so as to plan ahead and compensate for climatic change, as well as for current conditions, These objects are attained with bags containing suitable plant nutrients, preferably pre-fertilized and pH-adjusted, and provided with readily slittable locations in the upper and lower surfaces of the bag, as prospective insertion sites for seeds or seedlings in the upper surface and as water drain locations in the lower surface. The bag also conveniently provides selectable light/dark surfaces enabling improved control over the moisture and temperature inside.

Other objects of the present invention will become apparent from the following description and the accompanying illustrations of preferred embodiments of this invention.

DESCRIPTION OF THE INVENTION

Figure 1A:
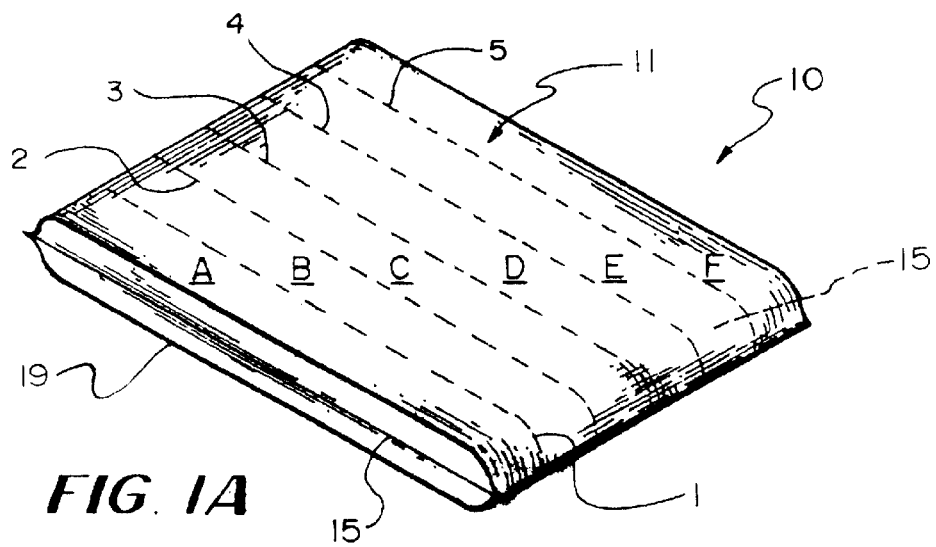
FIG. 1A is a perspective view of a generally rectangular bag, such as may be devoted to practice of this invention.
Figure 1B:
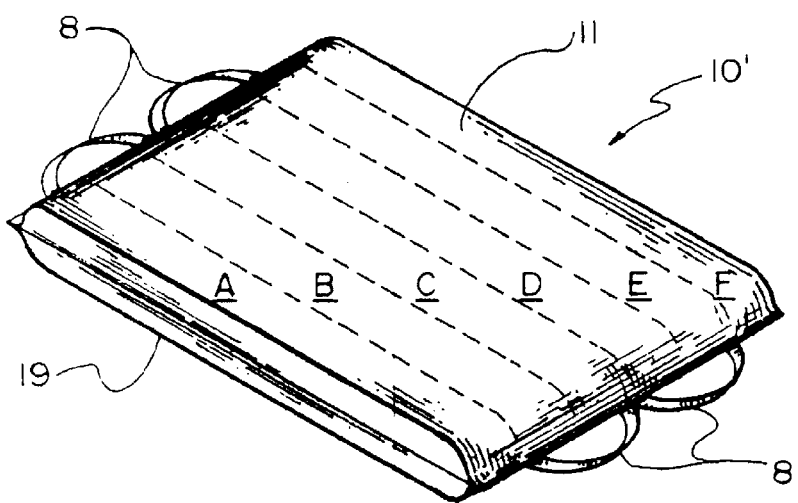
FIG. 1B is a like view of the uppermost surface of such plant bag, with pairs of end straps to aid carrying or lifting of it.

FIG. 1A shows embodiment 10 of this invention, in perspective, from above and to one side, in a non-use position, not necessarily to scale. The filled bag comprises top or upper sheet portion 11, and similar bottom or lower sheet portion 19, together surrounding contents 15'—not visible here. FIG. 1B shows optional pairs 8, 8 of flexible handles attached to opposite ends of bag 10' to aid persons handling it. Even one handle per end would he helpful.

Notably visible in FIGS. 1A and 1B are broken lines 1, 2, 3, 4, and 5 extending lengthwise—evenly spaced—along the bag surface, designating lines of weakness (conducive to slitting) apportioning the visible top surface of the bag into narrow strips A, B, C, D, E, and F (ignoring vertical margins of the bag surface).

Such a bag may be formed easily, as by superimposing two sheets of suitable material of like size and shape, and then securing their respective side and end edges together, as by adhesive or stitching. Alternatively, a long sheet may be folded midway of its length to superimpose resulting half-sheets to be joined at respective edges. In either event, the respective free perimeters are joined on their adjacent free edges by single seam 15, to enclose and hermetically seal the contents—such as animal manure, compost, peat, and/or mixed nutrient medium—introduced meanwhile into the bag's open end.

Figure 1C:
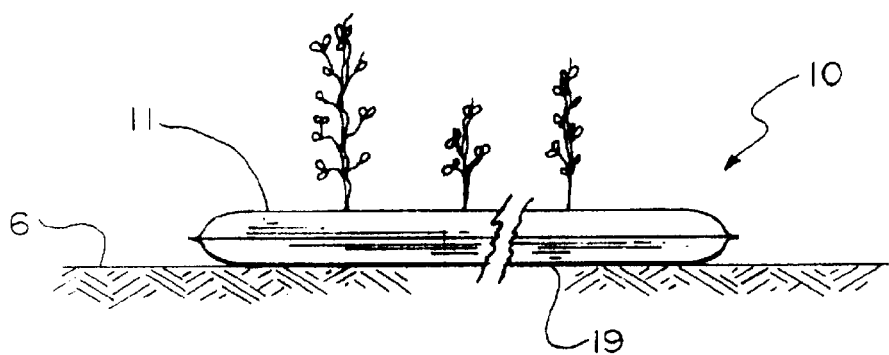
FIG. 1C is a side elevation of the bag laid in use position, with plants growing from slits opened at selected locations.

FIG. 1C shows, in side elevation, bag 10 in use position, with its lower or bottom sheet 19 lying mainly flat and out of sight on supporting surface 16, and its upper or top sheet 11 exposed upward. Slit pre-markings in lower sheet 19 of the bag, enable slitting for water drainage onto suitably receptive part(s) of surface 16, as before (but also possible after) the bag has been laid flat. Slit pre-markings in upper sheet 11 of the bag remain openable as desired to accommodate water, seeds, and/or seedlings.

Whereas bags with respective top and bottom single-layer sheets as in the foregoing embodiments are satisfactory in intended uses, respective sheets may be, alternatively, composite or multi-layered. Components of composite sheets may be alike or unlike, and have like or unlike exposed surfaces. The percentage of incident radiation reflected is called the albedo. For example, a composite sheet may have one reflective or shiny face and one absorptive or dark face whereon the sun's radiation falls, and either may be exposed on top.

Figures 2A, 2B:
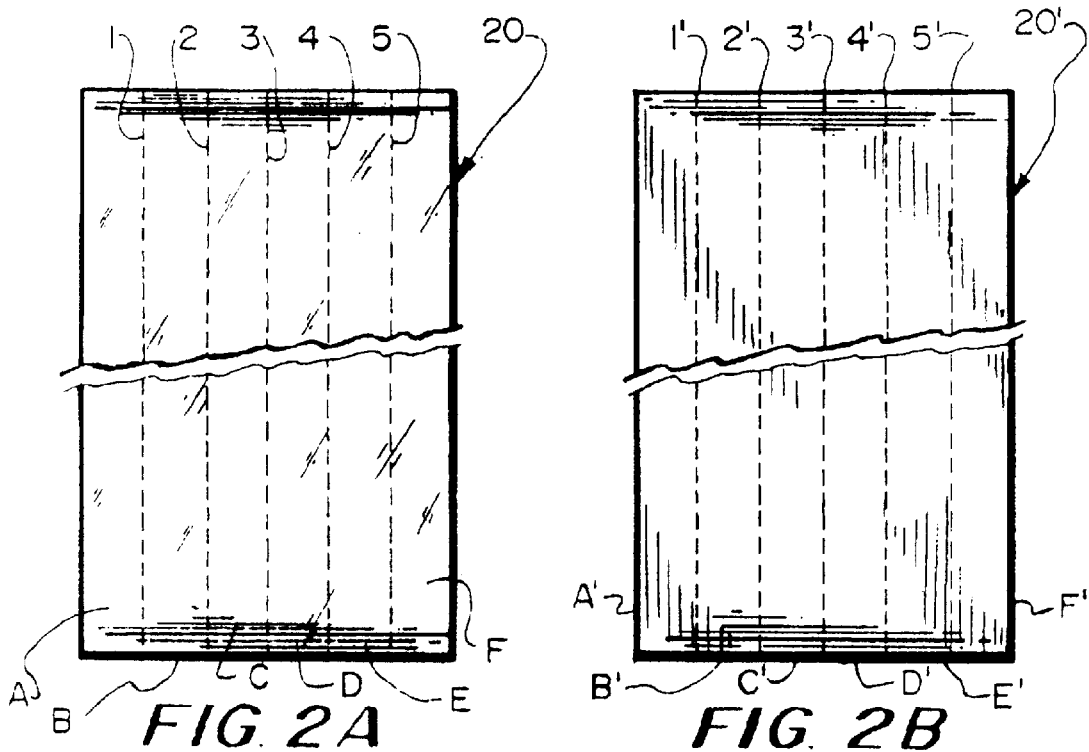
FIGS. 2A and 2B are fragmentary plan views of similar bags in use position, each pre-marked with longitudinal slit locations, the FIG. 2A bag having a visibly shiny or light-reflective top surface, and the bag of FIG. 2B having a dark or light-absorbing top surface.

FIG. 2A shows, in top plan view, the uniformly shiny or reflective upper surface of bag 20, otherwise similar to bag 10. FIG. 2B shows, in like plan view, dark absorptive upper surface of bag 20' otherwise similar to preceding bag 10. Indeed, bag 20' may simply be bag 20 inverted, thereby interchanging top and bottom surfaces, enabling selection of a given outer surface of the bag because it is shiny (and thus reflective) of incident radiation or, alternatively, an opposite outer surface because it is dark (and thus absorptive) of the incident radiation.

The respective high albedo of bag 20 and lower albedo of bag 20' may be moderated by a bag user (a grower), as by removing a part of the exposed top surface, such as any selected part of one or more of the strips pre-marked for slitting, as to lower the high overeall albedo of bag 20, or to raise the lower overall albedo of bag 20'.

Figure 3A:
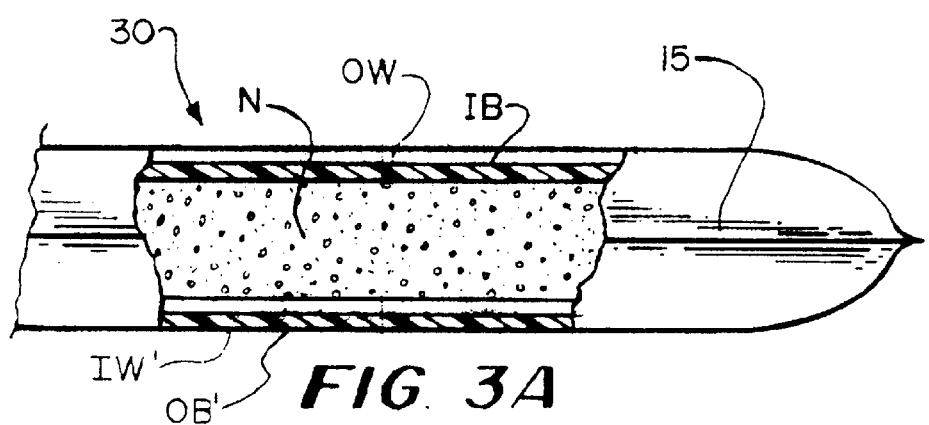
FIGS. 3A and 3B are fragmentary side elevations of outwardly similar bags in use position, having multi-layered upper and lower walls, being partly sectioned away to show their contents and wall structure, wherein the upper wall of the FIG. 3A bag has a shiny light-reflective outer layer and a dark contiguous underlayer, such layers being interchanged in the otherwise similar view of FIG. 3B.
Figure 3B:
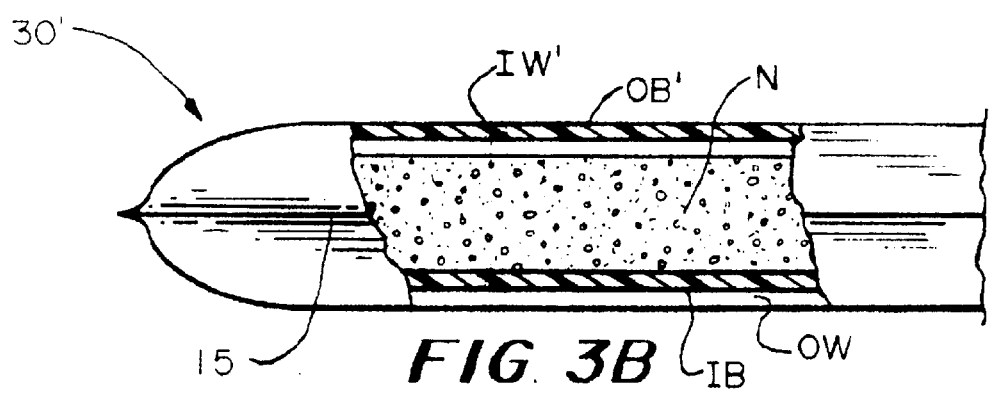

FIGS. 3A and 3B show in fragmentary transverse cross-section respective bags comprising similar multilayered sheets, each sheet having a shiny layer and a contiguous dark layer. Thus, the upper sheet of bag 30 of FIG. 3A has its shiny face OW exposed, and has its contiguous dark face IB hidden, in contact with contained nutrient N. At the bottom, shiny face IW' is on the inside, and dark face OB' is between it and the contents, thereby enabling the grower to choose to have either a shiny or a dark face exposed upward at the beginning of a season simply by orienting the desired surface of the bag upward.

FIG. 3B shows the opposite orientation of bag 30' wherein the locations of the respective sheet components are shown reversed. Bag 30' of FIG. 3B has dark face OB' of its top sheet exposed upward, and has its contiguous shiny face IW' hidden inside, while its bottom sheet has shiny face OW on the outside and has dark face IB hidden in between the shiny layer and contents N, opposite to FIG. 3A bag 30. A grower is thus enabled to start a season with either layer upward.

Usually climatic conditions vary from spring to summer to fall, so growers may wish the bag to become hotter or cooler by absorbing more or less sunlight. Such adaptability may be even more important if climatic conditions are abnormally cold or abnormally hot, when adaptability can be critical. The next illustrations show how multi-layered sheets enable adaptation to abnormal conditions, simply by sequential modification of the outer face of the upper sheet, to an extent that may varied progressively from time to time as desired. Partial removal of an outer layer exposes an oppositely absorptive or reflective layer underneath, to any extent and whenever desired.

Figure 4A:
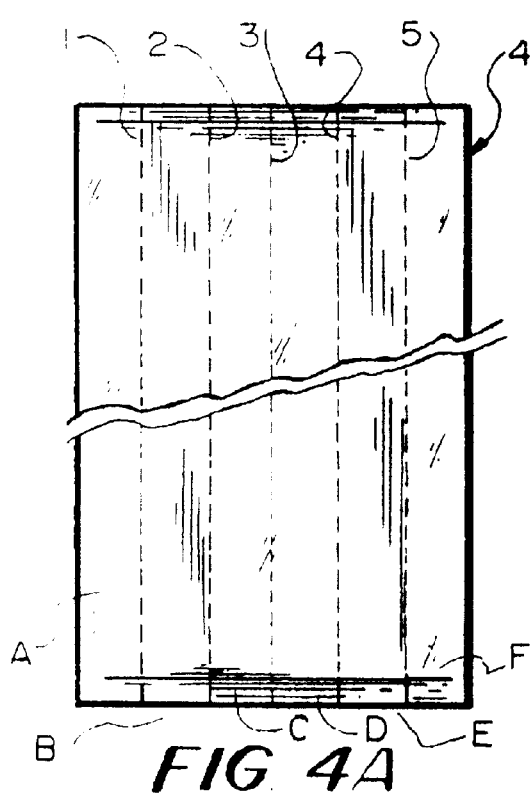
FIGS. 4A and 4B are sequential plan views of the FIG. 3A bag, with its top wall made appreciably less reflective over time.
Figure 4B:
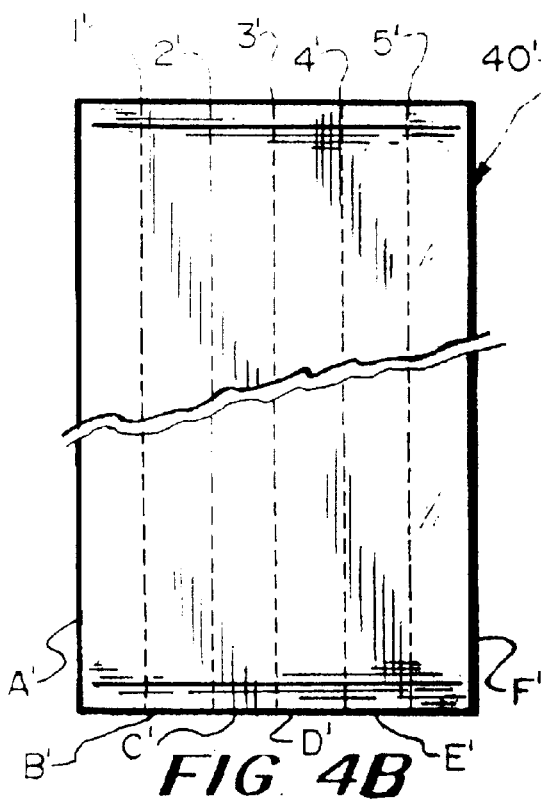

FIGS. 4A and 4B show, in sequential plan views, modifications of the exposed face 40 and 40' of a multilayered bag, having alphabetically slit portions pre-marked as in FIGS. 2A and 2B, but multilayered as in FIGS. 3A and FIG. 3B (or equivalents). Initially, the visible face in FIG. 4A began wholly shiny (like that of FIG. 2A), whereas the visible face in FIG. 4B began wholly dark (like that of FIG. 2B).

In FIG. 4A, such equivalent shiny strips A, C, D, and F remain in place, but former upper layer shiny strips B and E are absent, having been removed, thus exposing dark under-layer strips B' and E'. The top surface remains two-thirds shiny, but one-third is now dark.

In FIG. 4B, two more (C and D) of the originally pre-marked half-dozen shiny-surfaced portions have been removed stripwise, whereupon one-third of the surface remains shiny. The top surface is now two-thirds dark, with only one-third (A and F) still shiny.

Figure 5B:
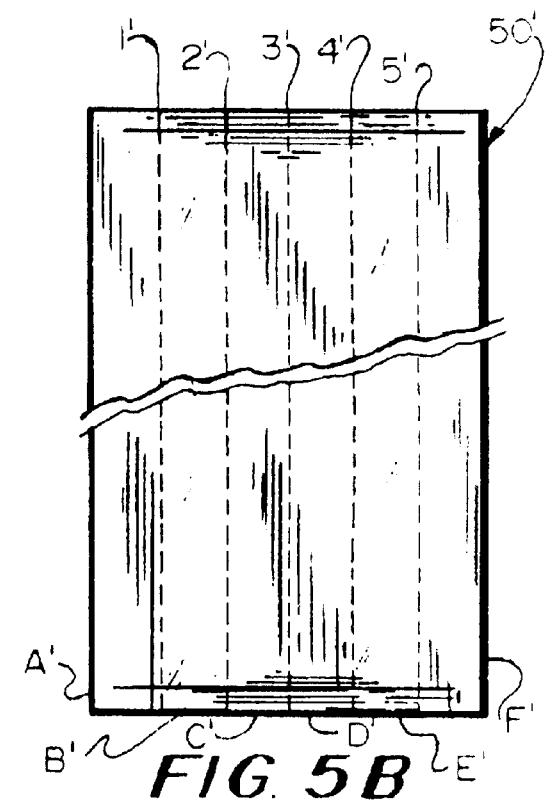
FIGS. 5A and 5B are sequential plan views of the FIG. 3B bag, with its top wall made appreciably more reflective over time.
Figure 5A:
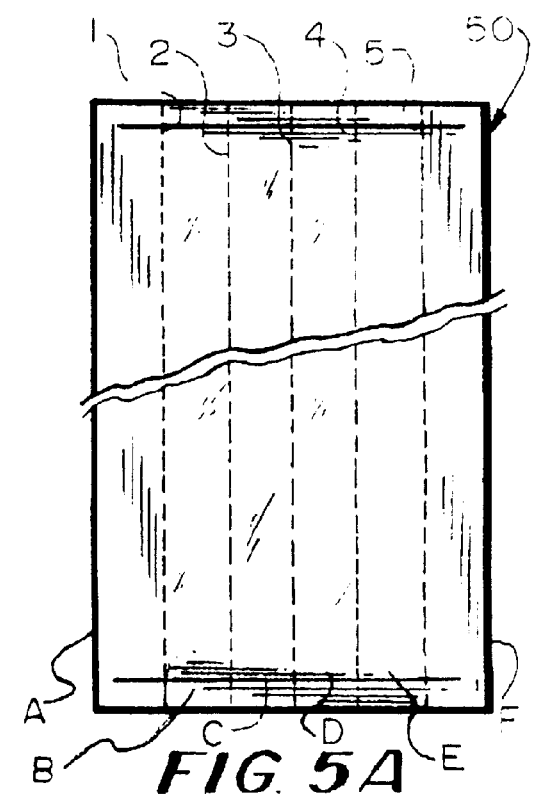

FIGS. 5A and 5B show respective modified faces 50 and 50'.

In FIG. 5A, equivalent dark strips A', C', D', and F' remain in place, but former upper layer dark strips B' and E' are absent, having been removed, thus exposing shiny under-layer strips B and E. The top surface remains two-thirds dark, but one-third is now shiny.

In FIG. 5B, two more (C' and D') of the originally pre-marked half-dozen dark-surfaced portions have been removed stripwise, whereupon one third of the surface remains dark, but the surface is now two-thirds shiny. Such procedure may be desirable to counteract the increasingly strong radiation from the sun, beginning in spring, increasing in late spring or early summer, and further to midsummer.

The illustrated progressive removal of strips from the various bags is simplified, as any part (or all) of an outer layer may be removed, piece-by-piece or together, however and whenever desired. Thus, a long growing season may call for the exterior of a bag to be darkly absorbent both early and late in the season, but reflective during mid-season, as by adding back in the fall some dark strips removed to expose more shiny surface in the mid-summer.

The initial contents of the bags are selected from appropriate sources of one or more of such plant nutrients as compost, manure, and peat. Those general nutrients may be supplemented by addition of fertilizers specifically rich in nitrogen (N), phosphorus (P), and potassium (K), with appropriate pH adjustment, as agriculturally appropriate for the specific plants intended to be grown in the bag.

The present invention improves upon conventional methods and means for starting plants and/or carrying seedlings to maturity, by giving the grower additional control over location, moisture, and temperature. Opening of a moderate number of the pre-marked drainage slits in the lower sheet is simple and effective to enable addition and retention of adequate moisture, without need for accouterments. If the bag is not to be laid directly onto soil into which excess water may drain without untoward consequences, or onto an impervious surface having prearranged drainage, more provision for water removal may be necessary but is not considered here The pre-marked slits in the uppermost sheet of the bag also may be opened readily (e.g., by penknife) to accommodate the number and kind of plants to be started, or grown to maturity, with due regard to the space required by them in their normal growing circumstances.

The bags are composed conveniently of recyclable paper or other fibrous material, even biodegradable polymers.

Component sheets in sigle-sheet or multiple-sheet bags may be colored conveniently with vegetable dyes or similar coloring material having desired radiation absorptivity/reflectivity properties compatible with agricultural utility and recycling objectives, especially where re-use for more than one seaon is impractical or undesired. Sheets of multi-layered bags are conveniently adhered peelably, as by a starch adhesive for one-season use, or by a vegetable gum adhesive for multi-season use or for convenient re-attachablility, whether in one or more seasons.

The bag dimensions are conveniently set for a usual weight of about sixty to eighty pounds, enabling convenient handling by one or two persons, and even twice that size is practical, especially with straps added at opposite end(s) and/or side(s) for convenience, such as was suggested above and illustrated in FIG. 1B.

Several bag embodiments have been disclosed, having respective advantages in addition to general utility of all the embodiments. The desirability of a particular feature may be fully realized only upon undertaking to practice the invention including that feature.

Modifications may be made in the preferred embodiments as by adding, combining, deleting, or subdividing compositions, parts, or steps, while retaining at least some advantages and benefits of the present invention—which itself is defined in the following claims.

What is claimed is:

1. Portable presealed bag prefilled with a bed of plant nutrient material, at least the uppermost exterior surface of the bag in its usage position being provided with the following:
   optionally and selectively removable dark (light-absorptive) layer portions of sheet material overlying, at least in part, a contiguous shiny (light-reflective) layer of sheet material, or
   optionally and selectively removable shiny (light-reflective) layer portions of sheet material overlying, at least in part, a contiguous dark (light absorptive) layer of sheet material.

2. Plant nutrient bag according to claim 1, wherein either respective exterior surface of the bag may constitute the upper surface of the bag in usage orientation, the bag having the following features, in relation to its interior:
   (i) at least one outwardly dark (light-absorptive) strip-like removable layer portion overlying an outwardly shiny (light-reflective) underlying layer; or
   (ii) at least one outwardly shiny (light-reflective) strip-like layer portion overlying an outwardly dark (light-absorptive) underlying layer;
   (iii) such outer layer portions being selectively removable and thereby enabling the albedo of the exposed bag surface to be varied a s desired relative to expected or prevailing climatic conditions by selective removal of at least one such outward upper portion.

3. Plant nutrient bag according to claim 2, wherein the bag is characterized by having both features (i) and (ii).

4. A plant nutrient bag according to claim 1, comprising
   a pair of sheet material portions of like size and shape joined along their respective available perimeters;
   upon either of which portions the bag is adapted to lie substantially flat in usage position, with the other lying thereabove, and with plant nutrient contents therebetween;
   both portions having pre-marked prospective locations for slits, upper slits for admission of water and seeds or seedlings, and lower slits to enable drainage of excess water therefrom.

5. Plant nutrient bag according to claim 4, provided with strap-like handles at its opposite ends to enable lifting and placement of the bag.

6. Plant nutrient bag according to claim 4, provided with nutrient contents sealed therein before any slitting of the bag.

7. Plant nutrient bag according to claim 6, wherein the nutrient contents comprise at least one of the following: (a) compost; (b) manure; (c) peat.

8. Plant nutrient bag according to claim 7, with contents pre-adjusted in pH and in available fertilizer content of at least one of the following: nitrogen (N); phosphorus (P); potassium (K).

9. Plant nutrient bag according to claim 4, in usage position, in combination with plants growing therein through pre-marked opened slits in its upper surface.

10. A portable self-contained bag of plant nutrient material according to claim 1, conducive to sprouting of seeds and to growth of seedlings therein; comprising
    a bag containing nutrient compost, manure, peat, or the like, the bag contents being pH pre-adjusted and pre-fertilized to favor the growth characteristics of plants of particular interest; and
    the bag being premarked for slitting upon its upper and lower surfaces relative to its use orientation.

11. Portable self-contained bed of plant nutrient material according to claim 10, wherein
    resulting slits in the upper surface of the nutrient bag are effective to admit rainfall or equivalent water, and to admit also seeds or seedlings, into the plant bed so provided; and
    resulting slits in the lower surface of the nutrient bag are effective to enable drainage of excess water from the plant bed provided by the nutrient bag.

12. Portable self-contained bag of plant nutrient material according to claim 11, with the bag exterior surface provided with a plurality of selectively removable portions of the following:
    (i) dark layer, or
    (ii) shiny layer, or
    (iii) both dark and shiny removable material,
    thereby enabling the albedo of the exposed bag surface to be varied relative to expected or prevailing climatic conditions.

* * * * *